March 31, 1925.  1,531,275
H. R. CULP
CLEANING CASTINGS AND MAKING GRANULATED ABRASIVES
Filed March 29, 1922
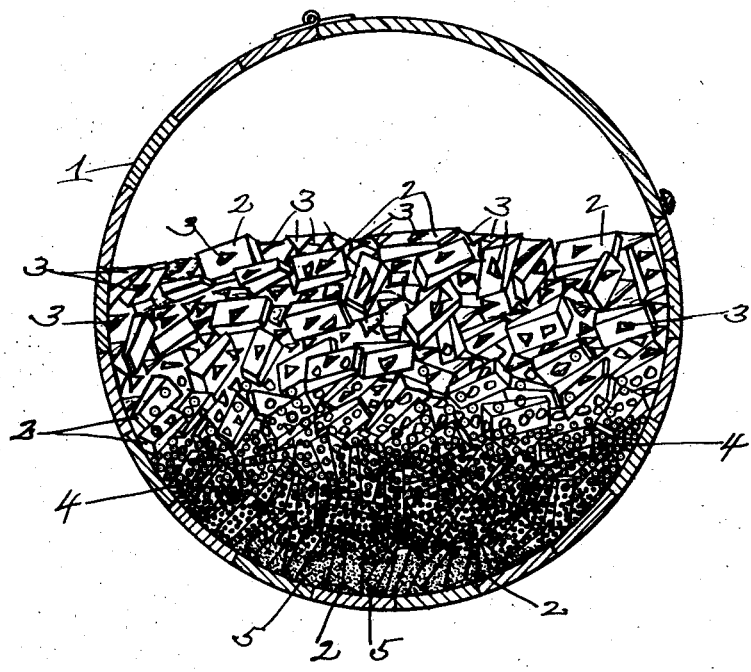
Inventor
Herbert R. Culp,
By
Attorney Patented Mar. 31, 1925.

1,531,275

UNITED STATES PATENT OFFICE.

HERBERT RAYMOND CULP, OF READING, PENNSYLVANIA.

CLEANING CASTINGS AND MAKING GRANULATED ABRASIVES.

Application filed March 29, 1922. Serial No. 547,836.

*To all whom it may concern:*

Be it known that I, HERBERT RAYMOND CULP, a citizen of the United States, residing at Reading, in the county of Berks and State of Pennsylvania, have invented new and useful Improvements in Cleaning Castings and Making Granulated Abrasives, of which the following is a specification.

Reference may be had to the accompanying drawings, and the reference characters marked thereon, which form a part of this specification.

The principal object of the invention is to simultaneously clean castings and make a granulated abrasive.

Other objects will appear in connection with the following description.

The single figure of the drawings is a view in cross-section of an ordinary tumbling barrel containing castings, and slag in fragmentary form more or less reduced to granular form, as in the operation of tumbling the castings in accordance with my invention.

Slag resulting from the melting of iron in founding is made up of mixed silicates mechanically associated with metallic iron in bodies of various dimensions and shapes.

The castings resulting from the founding of the iron, when removed from the molds are more or less rough, and have adherent to them scale and sand. Such castings are commonly finished by tumbling them in barrels in contact with coke, or with pieces of hard iron of irregular form such as jack stars, whereby the scale and sand are removed from the castings and the surfaces of the castings are more or less cleaned or polished.

Such castings are also sometimes finished by subjecting them to a sand-blast which is an expensive method.

I have ascertained that slag in fragmentary form has many advantages as an abrasive, and that in granulated form it makes a highly desirable substitute for sand in the sand-blasting process.

In carrying out my invention, I place the castings in the tumbler-barrel in contact with slag, which results from the melting of the iron in the founding process, after the slag has been cooled and more or less broken up by means of a sledge or the like.

I then proceed with the tumbling operation in the usual manner with the result that the broken pieces of the slag engage and clean the castings by attrition while the slag itself is gradually disintegrated and reduced to granular form.

As the slag is thus broken up by the tumbling process, the bodies of free iron are released from their mechanical association with the slag; and if the tumbling process be continued for a sufficient length of time, the slag will be reduced to granular form, and the castings will be cleaned and finished by their repeated contact with the fragments of slag and the bodies of free iron associated with or freed from the slag.

When the slag has thus been reduced to granular form, it is removed from the tumbling-barrel and the free iron is removed by screening out the larger particles of iron, and by the use of magnetic separators or by any other known process.

The granulated material which remains after the oversize material has been removed may be used for any purpose for which granulated abrasive is used, and is particularly adapted for use in sand-blasting; and this granulated material may be so used even though it contains free iron in granular form.

As above explained, however, the free iron may be entirely removed if desired, leaving only the granulated silicates for use as an abrasive.

By using the slag in the tumbling barrel to clean the castings, I am able without expense to reduce the slag to such form that the iron can be readily recovered therefrom, thus avoiding the employment of the expensive methods which it has been heretofore necessary to employ to recover the iron from slag.

My invention also produces a valuable abrasive product from what has heretofore been discarded as waste.

The granular material produced in accordance with my invention can be used for sand-blasting other castings or other articles of any kind.

The granular material for sand-blasting may be screened out after the oversize material has been screened out, and the residue of the slag may then be used for packing in the annealing of castings.

I have described my invention with reference to slag and castings produced by iron-founding, but it may be employed with respect to slag and castings resulting from the founding of various metals.

In the single figure of the drawing I have shown in a more or less diagrammatic manner a tumbling barrel, 1, containing a number of castings, 2, and fragments of slag, 3, which fragments by attrition are gradually reduced to granular form as shown at 4, and ultimately to pulverized form as shown at 5.

What I claim as new and desire to secure by Letters Patent is—

1. The method which comprises, tumbling castings prior to their being put to their normal commercial use, in contact with fragments of slag containing bodies of metallic iron, whereby fragments of slag are broken up and bodies of metallic iron are released from the slag and whereby the castings are freed from adherent scale, sand, etc.

2. The method which comprises, tumbling castings prior to their being put to their normal commercial use, in contact with fragments of slag containing bodies of metallic iron, whereby fragments of slag are broken up and bodies of metallic iron are released from the slag and whereby the castings are freed from adherent scale, sand, etc., and whereby some of the slag is reduced to granulated slag, and freeing the granulated slag from the oversize material.

3. The method which comprises, tumbling castings prior to their being put to their normal commercial use, in contact with fragments of slag containing bodies of metallic iron, whereby fragments of slag are broken up and bodies of metallic iron are released from the slag and whereby the castings are freed from adherent scale, sand, etc., and separating the bodies of metallic iron by themselves.

4. The method which comprises, tumbling castings prior to their being put to their normal commercial use, in contact with fragments of slag containing bodies of metallic iron, whereby fragments of slag are broken up and bodies of metallic iron are released from the slag and whereby the castings are freed from adherent scale, sand, etc., and whereby some of the slag is reduced to granulated slag, separating the bodies of metallic iron by themselves, and freeing the granulated slag from the oversize material.

In testimony whereof, I have hereunto set my hand this fifteenth day of March, 1922.

HERBERT RAYMOND CULP.